March 2, 1965     R. V. ARROYO     3,171,203

DENTAL MOUTH GAG AND MIRROR

Filed Feb. 1, 1963     2 Sheets-Sheet 1

INVENTOR.
ROBERTO V. ARROYO
BY Kimmel & Crowell
ATTORNEYS.

INVENTOR.
ROBERTO V. ARROYO
BY
Kimmel & Crowell
ATTORNEYS.

United States Patent Office 3,171,203
Patented Mar. 2, 1965

3,171,203
DENTAL MOUTH GAG AND MIRROR
Roberto Vázquez Arroyo, Pasaje Continental 14,
Ciudad Juarez, Chihuahua, Mexico
Filed Feb. 1, 1963, Ser. No. 255,468
5 Claims. (Cl. 32—40)

This invention relates to a dental appliance and has particular applicability to a device adapted to be positioned in the mouth of a dentist's patient to facilitate the work of the dentist on the teeth.

A primary object of the invention is the provision of such a dental appliance which is adapted to be positioned in the mouth of the patient over the lower teeth, provided with a bridge means which rests against the roof of the mouth, and a tongue depressor, together with a mirror normally positioned beneath the upper teeth so that the dentist may have a full view of the upper teeth upon which he is working.

An additional object of the invention is the provision of a device of this character which is fitted to the curvature of the mouth, so as to be relatively comfortable to the patient.

A further object of the invention is the provision of a device of this character having means for holding the cheek adjacent the work being done out of contact with the side molars.

A more specific object of the invention is the provision of illuminating means for the mirror which may be employed when necessary.

A still further object of the invention is the provision of an appliance of this nature which will expedite and facilitate dental work on the upper teeth, by enhancing visibility and positively precluding the contact of the moist tongue or cheek with the tooth or teeth being operated upon.

Still another object of the invention is the provision of a device of this character which is sturdy and durable in construction, reliable and efficient in operation, and relatively simple to manufacture and utilize.

Other objects will in part be obvious and in part be pointed out hereinafter and disclosed in the accompanying drawing wherein.

Similar reference character refer to similar parts throughout the several views of the drawings.

Figure 1:
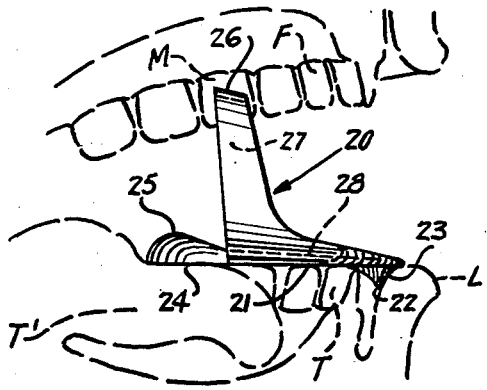
FIGURE 1 is a side view partially in elevation and partially in section showing one form of device embodying the instant inventive concept in the mouth of a patient, the latter being indicated diagrammatically.
Figure 2:
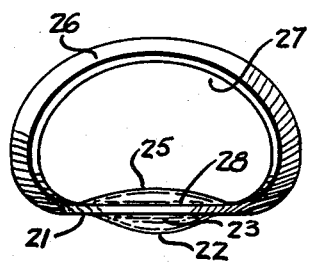
FIGURE 2 is a front elevational view of the device of FIGURE 1.
Figure 3:
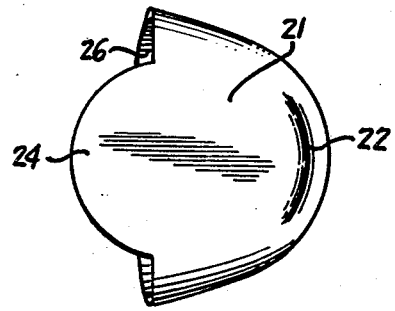
FIGURE 3 is a bottom plan view of the device of FIGURE 2.

Having reference now to the drawings in detail and more particularly to FIGURES 1 to 5, inclusive, one form of device embodying the instant inventive concept is generally indicated at 20 and comprises a bottom plate 21 which is substantially flat on its underside but includes a depending flange or lip 22 which is of generally arcuate transverse configuration and includes a rounded forward portion 23. Flange 23 is adapted to engage behind the lower lip L of the individual and forwardly of the lower teeth T. The rear or inner portion of plate 20 is reduced and of semi-circular configuration as indicated at 24 and includes a bulbous upper portion 25. The tongue T' is positioned beneath the portion 24 when the device is in use. An arcuate bridge 26 extends upwardly from the opposite sides of the plate 21, leaves a central passage or space 27, the top of bridge 26 being engaged by the upper side molars M, leaving the front teeth F free to be worked upon by the dentist.

The curvature of the bridge 26 is such, that in accordance with the size of the patient's mouth, it may be engaged either by the side molars as indicated in FIGURE 1 or by the roof of the mouth, whichever is more comfortable and convenient. A mirror 28 is positioned on the top of plate 21 and underlies the front teeth F, so that the dentist in working on the front teeth may look downwardly into the mirror to observe the rear or innerside of the front teeth, without the necessity of using the conventional hand mirror. Thus, both hands of the densist are left free for actual dental work on the teeth, providing a marked advantage in facilitating and expediting dental work.

Figure 6:
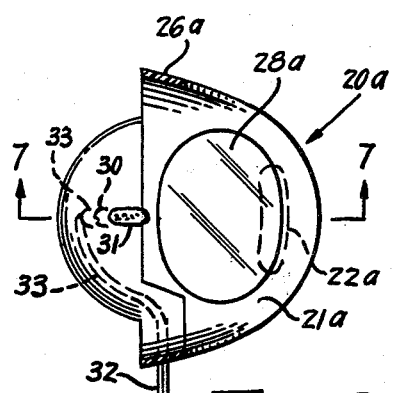
FIGURE 6 is a top plan view similar to FIGURE 4 showing a modified form of construction, parts thereof being broken away, and parts being indicated in dotted lines.
Figure 4:
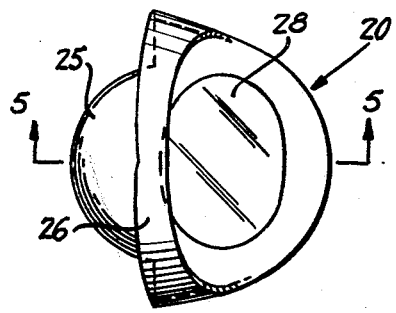
FIGURE 4 is a top plan view of the device of FIGURE 3.
Figure 7:
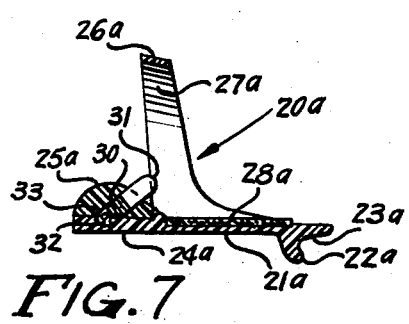
FIGURE 7 is a sectional view taken substantially along the line 7—7 of FIGURE 6 as viewed in the direction indicated by the arrows.
Figure 5:
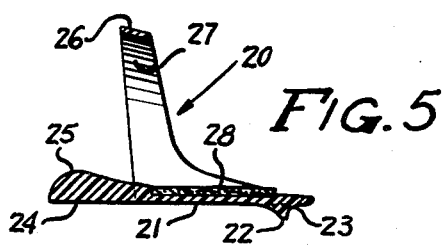
FIGURE 5 is a sectional view taken substantially along the line 5—5 of FIGURE 4 as viewed in the direction indicated by the arrows.
Figure 8:
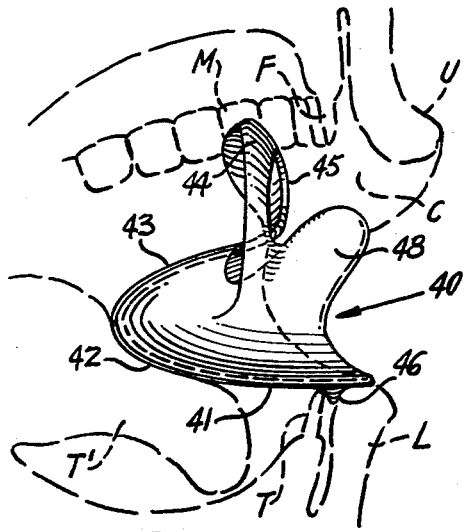
FIGURE 8 is a view similar to FIGURE 1 showing a modified form of construction.
Figure 9:
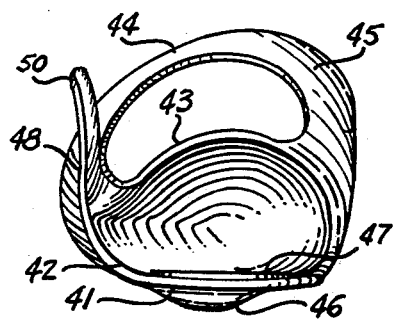
FIGURE 9 is a front elevational view of the device of FIGURE 8 as viewed from the right in FIGURE 8.
Figure 10:
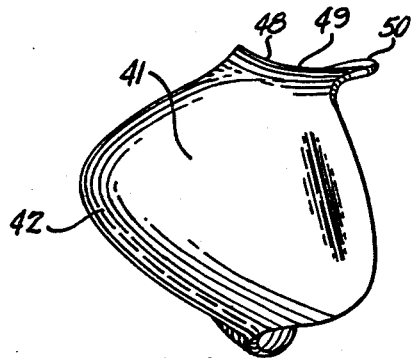
FIGURE 10 is a bottom plan view of the device of FIGURE 9.
Figure 12:
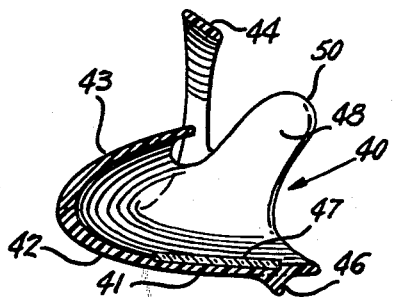
FIGURE 12 is a sectional view taken substantially along the line 12—12 of FIGURE 11 as viewed in the direction indicated by the arrows.
Figure 11:
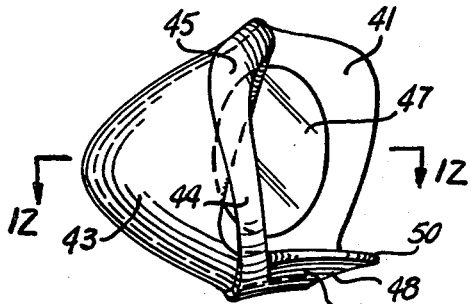
FIGURE 11 is a top plan view of the device of FIGURE 9.

FIGURES 6 and 7 disclose a slightly modified form of construction generally indicated at 20a, which comprises a plate 21a having a depending flange 22a with a more marked and sharper curvature as at 23a so as to form and effect a hook engaging behind the lower lip. Rear semi-circular portion 24a is provided with an enlarged upper bulbous portion 25a, the bridge 26a and mirror 28a being identical to that of the previously described modification. However, in this form, bulbous portions 25a is provided with a reecss or socket 30 in which is positioned a miniature electric bulb 31. Current is supplied to the bulb 31 through a cord 32 which extends through a passage 33 in bulbous portion 25a and out of suitable opening in the side of plate 21a directly beneath the bridge 26a extending out of the side of the patient's mouth. By virtue of this arrangement the mirror 28a is adequately illuminated when the normal lighting is insufficient to see clearly into the interior of the patient's mouth.

FIGURES 8 to 12, inclusive, disclose a further modified form of the invention. In this form of the invention the device, generally indicated at 40, includes a bottom member 41 which has an upwardly and inwardly arced rear portion 42 which merges into a top shell or cover 43, from the sides of which a bridge 44 extends upwardly. The bridge is provided with a rounded forwardly and downwardly extending portion 45 to enable it to fit comfortably against the sides of the upper front molars M, while the lower rounded portions 42 comfortably accommodates the tongue T'. A lower depending arcuate flange 46 engages behind the lower lip L and forwardly of the lower teeth T in the same manner as the previously described flange 22. In this modification the cover 43 prevents saliva from the mouth falling on the mirror 47 which is positioned in substantially the same position as the previously described mirror 28. A side or cheek engaging projection 48 extends upwardly and is inwardly arced as at 49, having an outwardly flared upper extension 50, which engages the upper cheek C interiorly of the upper lip U to hold the same spaced away from the upper front teeth F. The cheek engaging portion precludes the engagement of the cheek or upper lip with the front teeth being worked on, and directs saliva from the roof of the mouth downwardly exteriorly of the shell formed by the rounded portions 43 and 42. Similarly, in this configuration, the relatively rounded undersurface to the rear of plate 41, as indicated at 42, provides a more comfortable and spacious area for the tongue, while the upper teeth are being worked upon.

Figure 13:
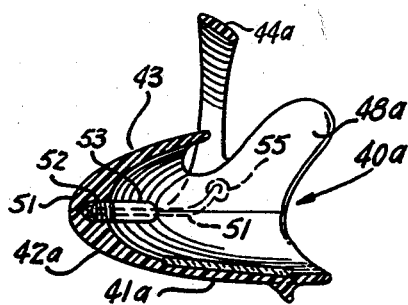
FIGURE 13 is a view similar to FIGURE 12 showing a modified form of construction.

A slightly modified form of the invention is shown in FIGURE 13, and is substantially of the same configuration as the modification of FIGURES 8 to 12, as indicated at 40a. In this form a plate 41a extends upwardly rearwardly at 42a to merge with the top or shell 43a, the configuration being substantially identical to that previously described with the exception of the fact that the rear wall 51 at the juncture of the portions 42 and 43 is thickened or enlarged to provide a socket 52 for a bulb 53. A cord 54 extends through an opening in the thickened portion and out of an aperture 55 to drop out of the corner of the patient's mouth as in the previous modification of FIGURES 6 and 7. This form of the invention includes an upwardly extending cheek engaging portion 48a in a bridge 44a which acts in identically the same manner as the previously described bridge 44. By virtue of the arrangement shown in any of the foregoing modifications of this inventive concept, it will be understood that a dentist working on the upper anterior teeth of a patient is in a position to use both hands freely for dental implements, without the necessity of employing one hand to hold the conventional dentist's mirror. It will also be seen that the mouth is maintained in open position, precluding the possibility of involuntary closure thereof, that the tongue is normally depressed and maintained out of contact with the teeth, thus avoiding moistening of the teeth while being worked upon, an undesirable condition, and that additionally in certain of the modifications the work areas are illuminated and saliva is prevented from either fogging the mirror or contacting the surfaces being treated.

It will also be seen that there is herein provided an improved dental appliance which accomplishes all the objects of this invention, and others, including many advantages of great practical utility and commercial importance.

The device, as shown in FIGURES 8 to 12 and 13, inclusive, is adapted to be employed on the upper front teeth to one side or the other of the mouth and the lateral curvature is such as to conform to the configuration of the side of the mouth, cover portion 43 preventing the tongue from extending upwardly over the side edge of plate 41. Obviously, the device may be made in either right hand or left hand models, although only one such form is shown and described.

The device may be made from any desired material, although a relative rigid plastic has been found to be suitable.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A dental appliance comprising a relatively flat plate adapted to be positioned over the lower teeth, a flange on the underside of the plate adapted to be positioned behind the lower lip, a mirror on the upper surface of the plate, an arcuate bridge extending upwardly from the sides of said plate and adapted to hold the mouth in open position, said plate having a tongue depressing portion extending rearwardly of said bridge, and a bulbous upper protuberance on said last-mentioned portion.

2. The structure of claim 1 further comprising, in combination, illuminating means adjacent said mirror.

3. A dental appliance comprising a relatively flat plate adapted to be positioned over the lower teeth, a flange on the underside of the plate adapted to be positioned behind the lower lip, a mirror on the upper surface of the plate, an arcuate bridge extending upwardly from the sides of said plate and adapted to hold the mouth in open position, said plate having a tongue depressing portion extending rearwardly of said bridge, and an arcuate cover portion extending over the said tongue depressing portion.

4. The structure of claim 3 further comprising, in combination, illuminating means adjacent said mirror.

5. A dental appliance comprising a relatively flat plate adapted to be positioned over the lower teeth, a flange on the underside of the plate adapted to be positioned behind the lower lip, a mirror on the upper surface of the plate, an arcuate bridge extending upwardly from the sides of said plate and adapted to hold the mouth in open position, said plate having a tongue depressing portion extending rearwardly of said bridge, an arcuate cover portion extending over the said tongue depressing portion, and an inwardly and outwardly extending cheek engaging portion.

References Cited in the file of this patent
UNITED STATES PATENTS 2,201,331     Wright _____ May 21, 1940

FOREIGN PATENTS 46,267     Germany _____ Feb. 26, 1889
674,647     France _____ Jan. 30, 1930